(12) United States Patent
Klimenko (10) Patent No.: US 8,503,826 B2
(45) Date of Patent: Aug. 6, 2013

(54) SYSTEM AND METHOD FOR COMPUTER-AIDED IMAGE PROCESSING FOR GENERATION OF A 360 DEGREE VIEW MODEL

(75) Inventor: Dmitry Klimenko, Tomsk (RU)

(73) Assignee: 3DBin, Inc., Palo Alto, CA (US)

( * ) Notice: Subject to any disclaimer, the term of this patent is extended or adjusted under 35 U.S.C. 154(b) by 641 days.

(21) Appl. No.: 12/711,049

(22) Filed: Feb. 23, 2010

(65) Prior Publication Data

US 2010/0214392 A1    Aug. 26, 2010

Related U.S. Application Data

(60) Provisional application No. 61/154,701, filed on Feb. 23, 2009.

(51) Int. Cl.
*G06K 9/32*    (2006.01)

(52) U.S. Cl.
USPC ........... 382/294; 382/154; 382/168; 382/260; 382/261; 382/264; 382/274

(58) Field of Classification Search
USPC ................. 382/154, 294, 168, 260–261, 264, 382/274
See application file for complete search history.

(56) References Cited

U.S. PATENT DOCUMENTS

| | | | |
|---|---|---|---|
| 4,985,854 A * | 1/1991 | Wittenburg | 345/421 |
| 6,184,901 B1 * | 2/2001 | Silva et al. | 345/474 |
| 6,201,881 B1 * | 3/2001 | Masuda et al. | 382/100 |
| 6,208,347 B1 * | 3/2001 | Migdal et al. | 345/419 |
| 6,456,323 B1 * | 9/2002 | Mancuso et al. | 348/218.1 |
| 6,611,268 B1 * | 8/2003 | Szeliski et al. | 345/473 |
| 7,123,263 B2 * | 10/2006 | Harvill | 345/473 |
| 7,142,726 B2 * | 11/2006 | Ziegler et al. | 382/285 |
| 7,174,035 B2 * | 2/2007 | Liu et al. | 382/118 |
| 7,265,761 B2 * | 9/2007 | Chou et al. | 345/586 |
| 7,355,607 B2 | 4/2008 | Harvill | |
| 7,453,456 B2 * | 11/2008 | Petrov et al. | 345/419 |
| 7,460,130 B2 * | 12/2008 | Salganicoff | 345/590 |
| 8,300,986 B2 * | 10/2012 | Kochi et al. | 382/299 |
| 2003/0034976 A1 * | 2/2003 | Raskar et al. | 345/427 |
| 2003/0117392 A1 | 6/2003 | Harvill | |
| 2004/0070582 A1 | 4/2004 | Smith et al. | |
| 2004/0196282 A1 | 10/2004 | Oh | |
| 2004/0202364 A1 * | 10/2004 | Otani et al. | 382/154 |
| 2004/0227766 A1 | 11/2004 | Chou et al. | |

(Continued)

OTHER PUBLICATIONS

Automatic 3D—sequences, Fitzgibbon et al., Springer 1998, pp. 154-169.*

(Continued)

*Primary Examiner* — Jayesh A Patel
(74) *Attorney, Agent, or Firm* — Patent Jurist; Georgiy L. Khayet (57) ABSTRACT

There is provided an algorithm that allows one, using a sequence of object images provided at different angles, to generate a 360 degree view model of an object. To generate such a model, the inventive algorithm may involve the following tasks: 1) provide a set of images (the number and size are unlimited), 2) reduce their features to the same brightness and contrast, 3) separate an object from a complex (heterogeneous) background in the images, 4) stabilize the objects in every image with respect to each other, and 5) process the resulting sequence of images to generate a 360 degree view.

20 Claims, 6 Drawing Sheets

(56) References Cited

U.S. PATENT DOCUMENTS

| | | | |
|---|---|---|---|
| 2005/0069188 | A1 | 3/2005 | Rubbert et al. |
| 2005/0131658 | A1 | 6/2005 | Mei et al. |
| 2006/0227133 | A1 | 10/2006 | Petrov et al. |
| 2006/0232583 | A1 | 10/2006 | Petrov et al. |
| 2008/0136814 | A1 | 6/2008 | Chu et al. |
| 2008/0246759 | A1 | 10/2008 | Summers |

OTHER PUBLICATIONS

An iterative—stereo vision.,Lucas et al., DARPA, Apr. 1981, pp. 121-131.*

Robust and fast modelling—views, Wolfgang Niem, SPIL, vol. 2182, 1994, pp. 388-397.*

G. Slabaugh et al., "A survey of methods for volumetric scene reconstruction from photographs", International Workshop on Volume Graphics, New York, USA, 21-22, 2001.

S.M. Seitz et al., "Photorealistic Scene Reconstruction by Voxel Coloring", IEEE Conference on Computer Vision and Pattern Recognition Conference, San Juan, Puerto Rico, 1067-1073, 1997.

R.I. Hartley, "Euclidean Reconstruction from Uncalibrated Views", Proceeding of the DARPA-ESPRIT Workshop on Applications of Invariants in Computer Vision, Azores, Portugal, pp. 187-202, Oct. 1993.

H.-Y. Shum et al., "Interactive 3D Modeling from Multiple Images Using Scene Regularities", SMILE Workshop, Freiburg, Germany, pp. 236-252, Jun. 1998.

C. Colombo et al., "Metric 3d reconstruction and texture acquisition of surfaces of revolution from a single uncalibrated view", PAMI, 27(1):99-114, Jan. 2005.

A.W. Fitzgibbon et al., "Automatic 3D model construction for turntable sequences", In R. Koch and L. Van Gool, editors, 3D Structure from Multiple Images of Large-Scale Environments, European Workshop SMILE '98, vol. 1506 of Lecture Notes in Computer Science, pp. 155-170, Freiburg, Germany, Jun. 1998.

G. Vogiatzis et al., "Reconstructing relief surfaces", Image and Vision Computing 26, 397-404, 2008.

G. Cross et al., "Surface reconstruction from multiple views using apparent contours and surface texture", in: NATO Advance Research Workshop on Confluence of C. Vision and C. Graphics, Ljubljana, Slovenia, pp. 25-47, 2000.

R. Cipolla et al., "3D models of architectural scenes from uncalibrated images and vanishing points", In In Proc. $10^{th}$ IAPR, pp. 824-829, 1999.

O. Faugeras, "Stratification of three-dimensional vision: projective, affine and metric representation", J. Opt. Soc. Am., (A12): 465-484, Mar. 1995.

H.-Y. Shum et al., "Interactive construction of 3d models from panoramic mosaics", In CVPR, pp. 427-433, 1998.

R. Ziegler et al., "3D Reconstruction Using Labeled Image Regions", Eurographics Symposium on Geometry Processing, pp. 1-12, 2003.

B. Micusik et al., "3D Metric Reconstruction from Uncalibrated Omnidirectional Images", Asian Conference on Computer Vision, Jeju Island, Korea, Jan. 28-30, 2004.

P.J. Besl et al., "A Method for Registration of 3-D Shapes", IEEE Trans. Pattern Analysis and Machine Intelligence, 14:239-256, Feb. 1992.

R.I. Hartley, "Euclidean reconstruction from uncalibrated views", In In $2^{nd}$ Proc. Europe-U.S. Workshop on Invariance, pp. 237-256, 1993.

B. Boufama, et al., "Euclidean constraints for uncalibrated reconstruction", Technical Report, LIFIA—IRIMAG, 1993.

W. Niem, "Robust and fast modeling of 3d natural objects from multiple views", In Proc. SPIL, vol. 2182, pp. 388-397, 1994.

B.D. Lucas et al., "An iterative image registration technique with an application to stereo vision", Proceedings of DARPA Imaging understanding workshop, pp. 121-130, Apr. 1981.

* cited by examiner

| -1*k/24 | -1*k/24 | -1*k/24 | -1*k/24 | -1*k/24 |
|---------|---------|---------|---------|---------|
| -1*k/24 | -1*k/24 | -1*k/24 | -1*k/24 | -1*k/24 |
| -1*k/24 | -1*k/24 | k+1     | -1*k/24 | -1*k/24 |
| -1*k/24 | -1*k/24 | -1*k/24 | -1*k/24 | -1*k/24 |
| -1*k/24 | -1*k/24 | -1*k/24 | -1*k/24 | -1*k/24 |

SYSTEM AND METHOD FOR COMPUTER-AIDED IMAGE PROCESSING FOR GENERATION OF A 360 DEGREE VIEW MODEL

CROSS-REFERENCE TO RELATED PATENT APPLICATIONS

The present application relies on and claims benefit of priority under 35 U.S.C. 119 from U.S. provisional patent application Ser. No. 61/154,701, filed Feb. 23, 2009, which is incorporated by reference herein in its entirety.

BACKGROUND OF THE INVENTION

1. Field of the Invention

This invention relates in general to methods for image processing and, more particularly, to providing system and method for computer-aided image processing for generation of a 360 degree view model.

2. Description of the Related Art

There is a widely accepted practice in multimedia advertising to present commodities, gadgets and other products online using a textual description, graphics or audio/video files. For instance, an on-line shop selling consumer electronics would display images of a variety of devices and gadgets, and a customer can select them by type, see pictures of the offered items, and use 360 degree rotating utility to examine all sides and views of the items. These product representations, as well as other such web-site showrooms, use pre-processed, high-resolution photographs or images generated via simulation or editing by means of a variety of graphics software programs. This type of processing is, however, costly and time-consuming. Moreover, a user preparing such representations needs certain qualification and skills in applying these graphics software. Clearly, a computer-automated image processing technique would provide every user with a possibility of improving a photograph without any specialized qualification or skills of image processing with graphics editors, and would significantly reduce the time spent on that compared to manual processing. In addition, this would make the 360 degree view generation much easier: 360 degree viewing is more informative and every 360 degree view required between 20 and 40 images, which, with the use of automatic algorithms, would be more time- and cost-effective than manual processing.

Therefore, there is a need for systems and methods for automated computer-aided image processing for generation of a 360 degree view model.

SUMMARY OF THE INVENTION

The inventive methodology is directed to methods and systems that substantially obviate one or more of the above and other problems associated with conventional techniques for image processing and presentation.

In accordance with one aspect of the inventive concept, there is provided a computer-implemented method for generating of a 360 degree view of an object. The inventive method involves using a camera to acquire a plurality of images of the object; using a processing unit to reduce the features of the plurality of the images to have substantially same brightness and contrast; using the processing unit to separate the image of the object from the background in each of the plurality of images; using the processing unit to stabilize the object in each of the plurality of images; and using the processing unit to process the plurality of images with stabilized object to generate the 360 degree view of the object.

In accordance with another aspect of the inventive concept, there is provided a computer-readable medium embodying a set of instructions, which, when executed by one or more processors causing the one or more processors to perform a method for generating of a 360 degree view of an object. The inventive method involves using a camera to acquire a plurality of images of the object; using a processing unit to reduce the features of the plurality of the images to have substantially the same brightness and contrast; using the processing unit to separate the image of the object from the background in each of the plurality of images; using the processing unit to stabilize the object in each of the plurality of images; and using the processing unit to process the plurality of images with stabilized object to generate the 360 degree view of the object.

In accordance with yet another aspect of the inventive concept, there is provided a computerized system for generating of a 360 degree view of an object, the system comprising a processing unit and a memory. In the inventive system, the processing unit is being configured to: receive a plurality of images of the object; reduce the features of the plurality of the images to have substantially the same brightness and contrast; separate the image of the object from the background in each of the plurality of images; stabilize the object in each of the plurality of images; and process the plurality of images with stabilized object to generate the 360 degree view of the object.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the present invention provide systems and methods for improving imagining and image processing. Based on an embodiment of the inventive algorithm, there is provided a software system for automatic processing of individual photographs and/or sets of images to be presented as a 360 degree view of an object. In one or more embodiment of the invention, one of the requirements set for such a software algorithm is that the high quality of processed images and the selection of a set of images for a 360 degree view providing a precise and detailed description of the shape of the object should be achieved in an automatic mode.

The material presented below is organized as follows. Section 1 deals with description of certain features of the inventive concept, the problems encountered and their solution. Section 2 describes the conditions of image generation. Section 3 contains description of the algorithm operation principles of an embodiment of the inventive algorithm, which are divided by stages, and presents a general application flow diagram (AFD). Section 4 provides a description of an exemplary computer platform.

Section 1 Goals and Objectives

In one or more embodiments of the invention, there is provided an algorithm that allows one, using a sequence of object images provided at different angles, to generate a 360 degree view model of an object. To generate such a model, the inventive algorithm may involve the following tasks: 1) provide a set of images (the number and size are unlimited), 2) reduce their features to the same brightness and contrast, 3) separate an object from a complex (heterogeneous) background in the images, 4) stabilize the objects in every image with respect to each other, 5) process the resulting sequence of images to generate a 360 degree view.

Below presented is a detailed description of the steps that may be performed to meet all the conditions of the tasks of an embodiment of the inventive algorithm formulated above.

Section 2 Conditions of Imaging

In one or more embodiments of the invention, one image or a sequence of object images acquired at different viewing angles is furnished to the input of the inventive algorithm. Additional input data that may be provided to the inventive algorithm may include an image of the scene without the objects (background image). In one embodiment of the invention, the scene is preferably white (possibly light, but distinctly different from the color of the object). A white-color background scene can be a sheet of white paper or a length of white fabric. The object should be positioned against this white background at the times when the images are acquired. Because images from various angles need to be acquired, the white background needs to be moved accordingly to ensure that all images of the object are acquired under similar conditions and using similar background. In one or more embodiments of the invention, in order to achieve a better quality (absence of jitter) of the 360 degree view model, so-called reference marks (preferably circular or oval) could be marked on the scene on both sides of the object in the field of view of shooting every time a new image is taken. Position of these reference marks is arbitrary as concerns the parts of the frame (upper, middle, or lower).

Section 3 General Computer Algorithm

In one or more embodiments of the invention, the algorithm provides for computer-automated processing of a single image or an image sequence, which consists in their pre-processing (reduction to uniform conditions, brightness enhancement/compression, noise removal), separation of an object from background (image clipping), creation of a uniform background and removal of minor interfering objects, and preparation of the image sequence to be presented as a 360 degree view.

In one or more embodiments of the invention, the main stages and steps of the algorithm are given in the AFD below and described in the text that follows. The algorithm operations corresponding to the AFD are presented in the text in parenthesis.

In one or more embodiments of the invention, imagery for generation of a 360 degree view model and image processing involves a few stages described below.

Stage-1 Loading and Preprocesing of Background Image

In one or more embodiments of the invention, availability of a background image with reference marks also facilitates white level correction, which ensures a faster and more efficient operation of the algorithm. The main steps of this processing stage are as follows.

In one or more embodiments of the invention, the input of the algorithm is Image Isrc, consisting of colors (Rsrc, Gsrc, Bsrc), of size N×M (where N,M is the total number of pixels in rows and columns). In order to identify the position and shape of the reference marks, we need a mask of the background image. The mask represents a binarized black-and-white analog of the background image. Now find an average gray color to obtain a binarized black-and-white image, where the average color would make the threshold.

Figure 1:
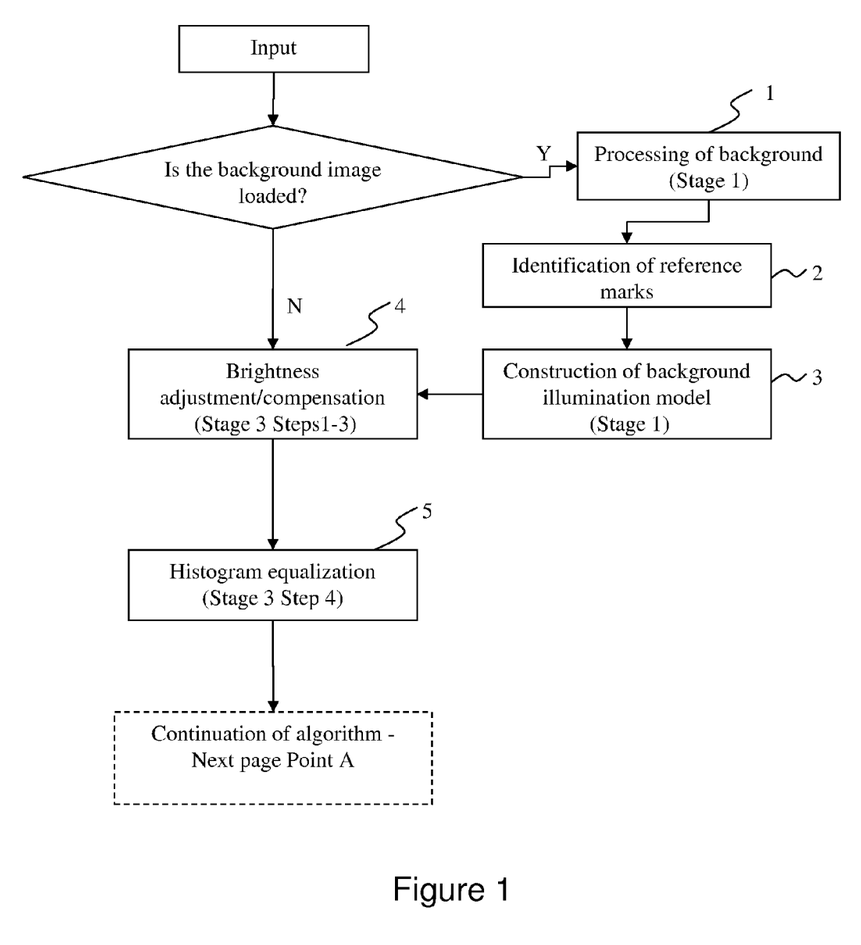
FIGS. 1-3 illustrate a general application flow diagram (AFD) of an exemplary embodiment of the inventive algorithm for generating 360 degree view of an object.
Figure 2:
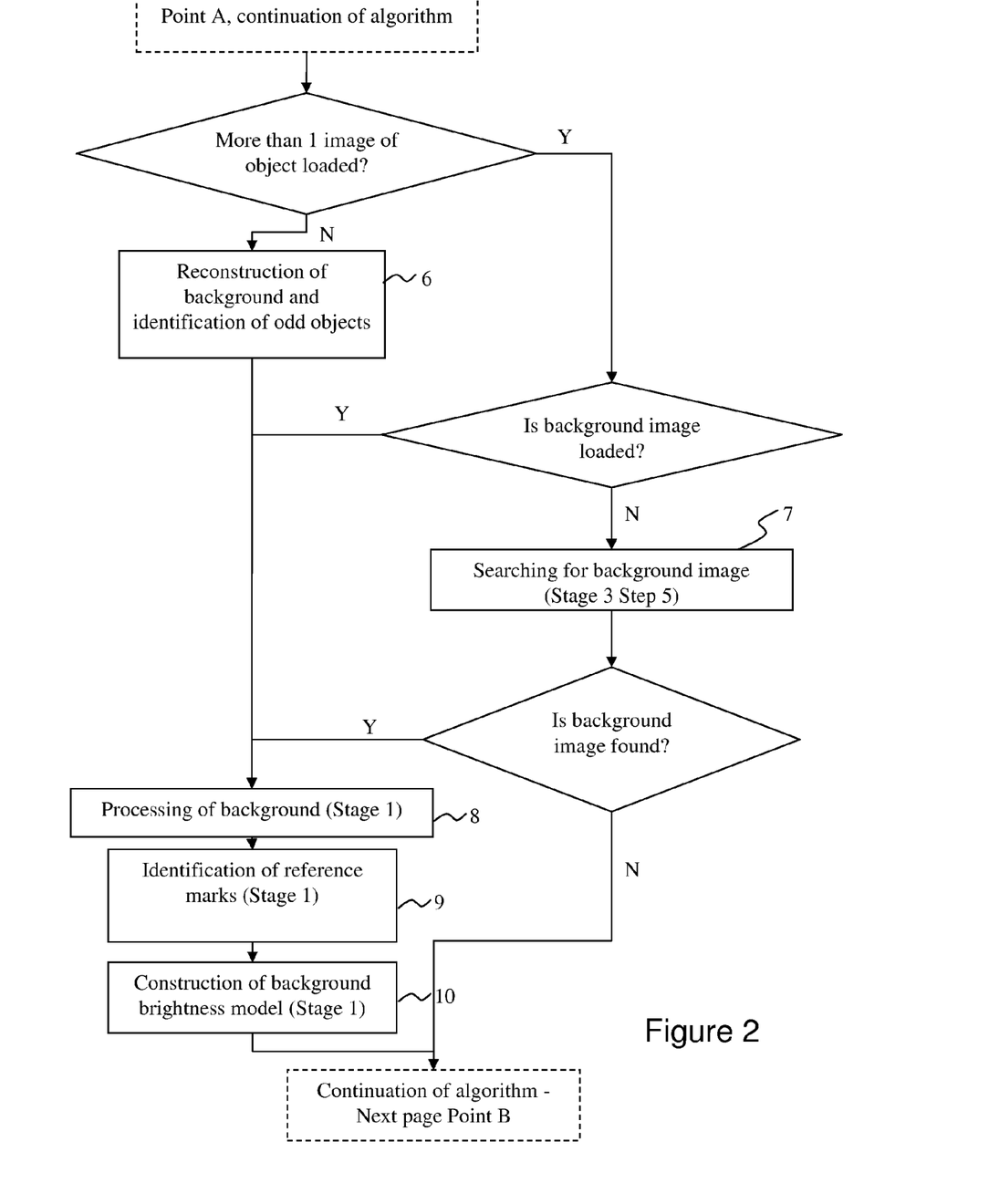

(FIG. 1, item 1 and FIG. 2, item 8) The average color (grayscale) in the background image is derived by the following equation for every image pixel:

$$Ires[i,j]=(Rsrc[i,j]+Gsrc[i,j]+Bsrc[i,j])/3 \qquad (1)$$

where: Ires is the resulting grayscale image, Rsrc, Gsrc, and Bsrc are the original color components, and i,j are the image pixel coordinates.

In one or more embodiments of the invention, to perform binarization, the average gray color is used as the threshold. In one or more embodiments of the invention, the average gray color is given by:

$$Iavg = \frac{\sum_{i=1}^{N}\sum_{j=1}^{M} Ires[i,j]}{N \times M}$$

where: Ires are the image pixels derived by Eq. (1).

In one or more embodiments of the invention, binarization is performed using the following formula for all pixels of the image:

$$Ibin[i,j] = \begin{cases} 0, & Ires[i,j] < Iavg \\ 255, & Ires[i,j] \geq Iavg \end{cases}$$

where: Ibin is the binarized image.

In one or more embodiments of the invention, the line contours that are obtained are subsequently combined using the Canny edge detection algorithm (described below) from the original background image (R, G, B) with the black-andwhite binarized mask obtained. This enhances the contrast of white regions singled out in the mask. After that, in one or more embodiments of the invention, the reference marks necessary to stabilize the image sequence are found. In one or more embodiments of the invention, stabilization provides for suppression of the camera jitter during shooting.

(FIG. 1, item 2 and FIG. 2, item 9) In one or more embodiments of the invention, the binarized image contains reference marks and odd objects. All the objects are white and the background is black. Thus, in order to separate the object from background one has to find all objects containing white color pixels. In one or more embodiments of the invention, separation of objects from background in a b/w image is performed using the following algorithm:

1. Start traversing the image row by row from the left upper corner towards the right lower corner.
2. Proceed traversing until you come across a white unindexed pixel.
3. Designate a current object index to this pixel (each object is indexed using its unique number).
4. Check whether or not the neighboring unindexed pixels contain white color from the region adjacent to this pixel and, if it is the case, number it with a unique index corresponding to the object.
5. Move back to the initial search point and continue traversing the row. Skip the indexed regions when encountered.
6. Save the characteristics of every object: location and shape as a square matrix (mask) mask measuring 64×64 pixels. If the shape of the object is different from square, scale the size of this matrix to a square one.

Considering that, in one or more embodiments of the invention, the shape of a reference mark is selected to be close to a circle or oval, further on, for every separated object check if it matches this reference mark, using the following equation:

$$Res[i, j] = \sum_{i1,j1}^{10} Imask[i + i1, j + j1] * MATR[i1, j1] \quad (2)$$

where: Res is the criterion indicating that the object matches the reference marks shape (circle or oval), Imask is the binarized image, MATR is the special mask to perform searching for the reference marks (brightness matrix of an averaged reference mark measuring 10×10) and indices i,j correspond to the original image indices (i=1,N and j=1,M). Elements of the matrix MATR are calculated using the equation $$MATR[i, j] = e^{\left(\frac{-(x[i,j]-x0)^2}{2sig}\right)} \quad (3)$$

Where x[i,j] are the mask indices (i=1, 10 and j=1, 10), x0 is the midpoint of the mask, and sig is a parameter selected aposteriori.

In one or more embodiments of the invention, after checking all so far separated objects, using Eq. (2), two objects best matching the reference marks (i.e., corresponding to a circle or oval) are singled out, since the res criterion for those objects has its maximum value, and the position of the objects in the image Isrc and their shape in Imask are the same.

The Canny edge detector is a well-known in the art technique for detecting object boundaries in the image. Its operation is briefly is illustrated using the following steps:

1. An image is smoothed with a Gaussian filter (see formula (3)) with the prescribed number sig to suppress noise and smear the object edges. This procedure is necessary to ensure that in the next steps, during differentiating, the differential points would have values acceptable for analysis (no spikes).
2. In every point of the image, calculate the gradient g(i,j) and orientation of the edge a(i,j). To calculate g(i,j) and a(i,j), use the formulas $$g(i,j) = \{G_i^2 + G_j^2\}^{1/2} \text{ и } a(i,j) = \arctg\{G_j/G_i\}$$

$$G_i = (z7 + 2z8 + z9) - (z1 + 2z2 + z3)$$

$$G_j = (z3 + 2z6 + z9) - (z1 + 2z4 + z7)$$

Where i,j are the indices of the original image, and z are the elements of the matrix shown below:

| Z1 | Z2 | Z3 |
|----|----|----|
| Z4 | Z5 | Z6 |
| Z7 | Z8 | Z9 |

In one or more embodiments of the invention, the differential value points (at the edge of the object) are determined as the points of the local maximum of the function g(i,j).

3. Further, find all the pixels with the corresponding maximum values and assign them the prescribed value (for instance, the maximum value is 255, and those differing from this are 0). As a result, thin lines appear against the background in the image, which correspond to the edges of the object.
4. Now, connect all the pixels on the line with each other to obtain a continuous line.

(FIG. 1, item 3) In order to reduce the brightness model to a certain standard and to a form independent of the measurement conditions, in one or more embodiments of the invention, one has to perform a few steps. In the first step, using the Canny algorithm (described above), find the contour lines from the input image, and in the second step—smear the image using a Gaussian mask (see formula (3)), where sig is chosen a posteriori.

$$I'bin[i, j] = \sum_{i1,j1}^{10} Ibin[i + i1, j + j1] * MATR[i1, j1] \quad (4)$$

(FIG. 1, item 4 or FIG. 2, item 10) In one or more embodiments of the invention, the image under processing is now reduced to gray color, for instance, using formula (1), and then is added to the input image as $$Isrc[i,j] = Isrc[i,j] + I'bin[i,j] \quad (5)$$

Where Isrc is the transformed image.

This procedure is performed for every color Isrc (R, G, B).

In one or more embodiments of the invention, in the long run, the processed image possesses fewer variations in the color grade palette. This is very important for automatic processing of a large number of images appearing in the next step.

In one or more embodiments of the invention, after the reference marks are found and the background image is preprocessed, the next step is to process the images with the object.

Stage 2 Single Image Processing

In one or more embodiments of the invention, if only one image is provided to the algorithm input, then in reconstructing the background one has to derive the brightness model, as done above, and then apply the mask obtained in Stage 2, step 4 to the image.

1. Construction of the mask consists in applying the Canny algorithm (described above) to the binarized image, followed by blurring of the image with a Gaussian filter, and combination of the processed image and the mask.

2. Searching for the main and odd objects on the mask. If the odd objects do not belong to noise but are the objects on the edges of the image (e.g., an edge of the table not covered with the white background), these objects are then earmarked to be removed in the next step.

3. Removal of the regions corresponding to the odd objects earmarked in the previous step. As a result of application of the mask, we have an image without the main object (white regions in the former location of the object).

4. (FIG. 2, item 6) When only the background and the main object are left, perform gradient filling the removed regions. After that, reconstruct the white areas in the image. The procedure for that consists in constructing a gradient in the white part of the image. Since the scene with the object is assumed to be white, so all the corners, or at least one corner, would contain white tones. It is now necessary to find the minimum and maximum white tones approximating the white color (for instance, 240-255). White pixels are filled using the following formula:

$$Ires[i,j]=Imin[i]*(Imax[i]-Imin[i]/(Jmin-Jmax)*j$$

Where: Ires is the resulting image, Imin[i] is the pixel value in the lower boundary of the white region, Imax[i] is the pixel value in the upper boundary of the white region, i is the number of the row where the gradient is applied, and j is the number of the pixel in the row.

5. Construction of the brightness mask follows the same routine as in processing of the background.

Stage 3 Loading and Preprocessing of Image with Object

In one or more embodiments of the invention, this procedure is necessary for color adjustment in the original image due to variable lighting conditions of the scene with the object and differing performance characteristics of photo/video cameras. Pseudo-white colors (substituting white color) might predominate in the image, which have to be reduced to the white color (with this reduction applied to every image pixel). This procedure is performed in a few steps.

(FIG. 1, Item 4)

STEP 1 Derive the Average Color of the Image Using Formula (1) (described above).

STEP 2 Find the relative contribution from every average color (for every color component) in the image using the following formula:

$$Iavg'=((Ravg+Gavg+Bavg)/3)/Iavg$$

Where: Iavg' is the resulting average color, Ravg, Gavg, Bavg are the average color components in channels R, G, B, and Iavg is the average original color.

STEP 3 Multiply every pixel value in the image Isrc (for every color component R, G, B) by Iavg'.

STEP 4 Histogram equalization. In one or more embodiments of the invention, this image processing method is applied to improve the image quality (to adjust the image contrast), since currently available commercial photocameras frequently dim or overexpose the images. This shortcoming is compensated for by histogram equalization (which is, in fact, clamping of color transition regions not used in the image, and equalization of the object and background colors within the histogram boundaries). To this end, construct an image histogram H using the image Ires[i.j]. Then, find the maximum and minimum values in this histogram (Hmax и Hmin). Repeat this procedure for every image in the provided sequence. This histogram helps separate the object from background.

Determination of equalization boundaries. In one or more embodiments of the invention, when the image histogram is constructed, find the target-histogram boundaries. To do so, perform a histogram search (256 values over R, G, B) from the beginning and from the end of the list. The search criterion is 0.1% of the histogram maximum for every color component (and could be varied for different cases when searching for Hmin and Hmax). After that, average the boundaries of all resulting histograms. In view of the fact that dimensions of the object can change in the course of its rotation, one has to equalize the histogram boundaries for each image, since they somewhat deviate from those of the average histogram.

Equalization of histogram boundaries. In one or more embodiments of the invention, to perform this procedure, the following formula is used:

$$Ihres[i, j] = \frac{(Ires[i, j] - Hmin) * 255}{Hmax - Hmin}$$

Where: Ihres[i,j] are the resulting image elements, Ires[i,j] is the original grayscale) image, Hmin is the lower histogram boundary, and Hmax is the upper histogram boundary.

In one or more embodiments of the invention, in the cases where the pixel value is beyond 225, it is set to be equal to 255. When the pixel value becomes <0, set it equal to 0.

(FIG. 2, item 7) STEP-5 Searching for an image of background. When the background image is not available, search for it in the frames provided.

1. Create two histograms along (horizontal) and across (vertical) the image for every image Ihres (from those provided for processing). To achieve this, perform a separate summation of all vertical and horizontal pixels.

(FIG. 3, item 14) 2. Construction of averaged histograms. Find the average value of all histograms in the horizontal and vertical directions.

(FIG. 3, item 15) 3. Calculate the shifts of all histograms with respect to the averaged histogram (find the maximum value of every histogram, the shift being the difference between the value of a histogram and the average histogram value).

Figure 3:
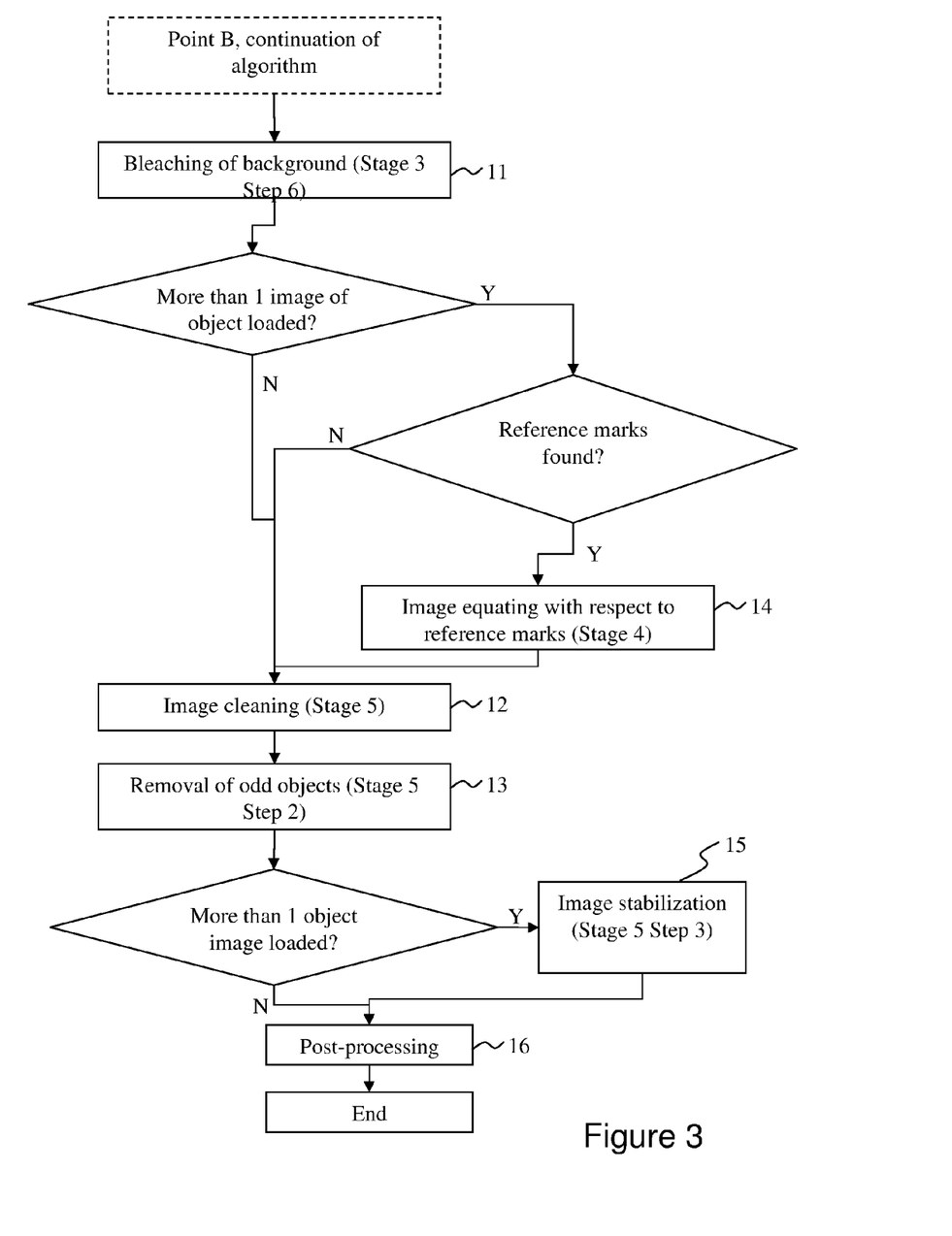

4. Pick out the image with the maximum shift (the difference obtained in step 3 would be maximum).

5. If the maximum shift exceeds a certain threshold (chosen a posteriori), this implies that the image pixel in question belongs to background.

(FIG. 3, item 11) STEP-6 Bleaching of background. In one or more embodiments of the invention, the following procedure is performed to remove the white space around the object. It consists in extending the image histogram beyond the 225 value boundary followed by clipping. The steps involved are as follows:

1) Obtain the average color of the image (see formula (1)).
2) Obtain the minimum black color. Its derivation follows the formula $$Iblc=Min(Ihres)$$

Where: Iblc is the minimum black color and Ihres is the image obtained in the previous step.

3) Bleaching of image. Bleaching is performed using the formula $$Ihres'[i, j] = \frac{(Ihres[i, j] - Iblc) * 255}{Iavg - Iblc} \quad (5)$$

Where: Ihres' is the resulting image, Iblc is the minimum black color, and Iavg is the average color.

(FIG. 3, Item 13) Stage 4 Stabilization of Image Frames Using Reference Marks In one or more embodiments of the invention, stabilization of frames is required to achieve a more precise overlay of background and to remove odd objects.

1. Searching for reference marks is performed in the same manner as with the algorithm presented in STAGE 1, one difference being the masks used: here one has to apply the brightness masks obtained for every image with the object, respectively.

2. In the case where no reference marks appear to be found for more than 40% images, stabilization cannot be achieved (the marks might be there, but the algorithm failed to recognize them). The frames without the reference marks identified are discarded from the image sequence.

3. Measure the spacing between the original reference marks in the background image.

4. Compare the spacing between the reference marks in every frame with that obtained in Step 3. When they differ, perform scaling of the respective frame to necessary size (to match the spacings). Scaling is based on comparing the current spacing between the reference marks and that measured in Stage 1 during processing of the background image (reference image). The ratio of the spacing in the current image frame to the one in the reference image would be the value used for scaling the image.

5. Translate every image to make the first reference mark coincide in its location with the first reference mark in the background image.

6. Rotate the image around the first reference mark (rotation axis) to achieve coincidence of the second reference mark of the image with the one in the background image.

(FIG. 3, Item 12) Stage 5 Image Cleaning

1. Overlay of background. In one or more embodiments of the invention, overlaying the background implies removing the illumination gradient from the image using the illumination model derived in STAGE-3. Overlaying of background is performed according to the following formula:

Irez[i,j]=Isrc[i,j]+Res[i,j]

where: Irez is the resulting image, Isrc is the original image, and Res is the pixel of the illumination model including the transformations (see formula 2).

2. Removal of odd objects (e.g., part of the floor in the frame), which are located at the edges of the image.

2.1. Searching for dark tone regions along the edges of the image. The background image obtained earlier has to be of a white tone (according to the a priori condition assumed). The object located in the center is generally of a color different from the background. Apart from the main object, the image can contain odd objects located at the edges, which are darker than the background. These objects have to be erased to leave only the background and the main object.

2.2. Checking whether the dark region has fallen within the "image center"—the region in the center of the frame (spaced 20% from the edge of the image frame).

2.3. If the dark region does not fall within the center, then it has to be bleached (a procedure using the algorithm based on the histogram method, which is given above—STAGE 3, STEP 4).

3. Image stabilization. In one or more embodiments of the invention, the system may further perform image stabilization, which is required to smooth rotation of the object.

3.1. In one or more embodiments of the invention, the system may perform searching for point-like features in all the images in the image sequence by the Tomasi-Shee algorithm (Pratt W. K. Digital image processing, Wiley Interscience, New York, 1978, incorporated by reference herein in its entirety).

3.2. In one or more embodiments of the invention, the system may perform comparison of point-like features in three adjacent frames by the Lucas-Kanade algorithm (described in Lucas B D and Kanade T 1981, An iterative image registration technique with an application to stereo vision. Proceedings of Imaging understanding workshop, pp 121-130, incorporated by reference herein in its entirety), and calculation of vectors for point-like feature motion step-by-step for every image in the sequence.

3.3. In one or more embodiments of the invention, the system may perform derivation of the average vectors of "motion" of the object via averaging the motion vectors of every pair of the adjacent frames.

3.4. In one or more embodiments of the invention, the system may perform searching for the motion path of the object along the averaged vectors. This path is made up by the serially connected motion vectors (derived in Stage 3.3 from the vector series in every frame), it shows the initial and final point of the object motion.

3.5. Construction of motion compensation of the object. In one or more embodiments of the invention, motion compensation may be performed to match the initial and final points of motion of the object.

In one or more embodiments of the invention, in order to derive motion compensation, calculate the distance between the initial and the final points of motion of the object, and divide every component (x,y) by the number of images in the sequence.

3.6. Object stabilization. At this stage, every image is translated with respect to its initial position by a vector reciprocal to the motion vector and motion compensation (step 3.5.) is performed.

(FIG. 3, Item 16) Stage 6 Postprocessing of Image

In this stage, in one or more embodiments of the invention, the inventive system crops the image in order to single out the image boundaries. This is performed using the color palette mask, and is followed by searching for the object whose color is different from white and by identification of the minima and maxima in the X and y axes. Since it is assumed that the background is white, a sharp boundary appears as a result, which allows us to detect the object boundary in the image. These values circumscribe a rectangle enclosing the object and are the sought-for object boundaries.

Cropping of "white" regions around the object. Note that the image contains a more chromatic white color, which only in a few points is equal to exact white (255). The boundaries generally have the form of regions limited by straight lines, and in the course of object separation we have the remaining regions whose color is not exactly white. In one or more embodiments of the invention, after traversing the contour, we set all the regions lying within the color channel approximating white to be equal to 225. The same is done for the region without the object.

After that, in one or more embodiments of the invention, actions similar to those described in STAGE-3, STEP-4 (Histogram equalization) are performed.

Figure 4:
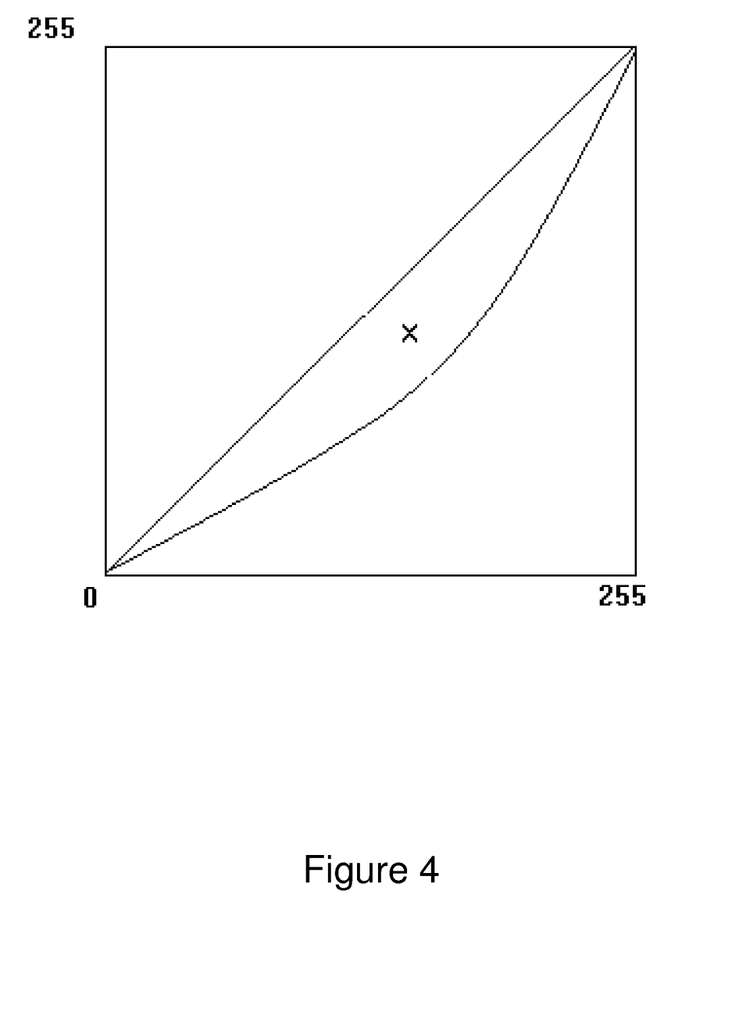
FIG. 4 illustrates an exemplary embodiment of an operation for smoothing the γ-function.

In one or more embodiments of the invention, in order to perform contrast correction, an operation for smoothing the γ-function is used. This smoothing is performed using the following algorithm: saturate the γ-function to achieve X=255−Iavg (X is the value to which the image was bleached in STAGE 3, STEP 2), as illustrated in FIG. 4.

Then, in one or more embodiments of the invention, every new pixel is calculated using the formula:

$$Ires[i, j] = \begin{cases} Isrc[i, j] - 1.5\sqrt{\frac{x^2}{2}} \frac{|Isrc[i, j]|}{128}, & Isrc[i, j] < 129 \\ Isrc[i, j] - 1.5\sqrt{\frac{x^2}{2}} \frac{|256 - Isrc[i, j]|}{128}, & Isrc[i, j] \geq 129 \end{cases}$$

Where:
X is the value of bleaching;
Ires is the resulting pixel; and
Isrc is the original pixel.

7.4. Improving the image sharpness.

Figure 5:
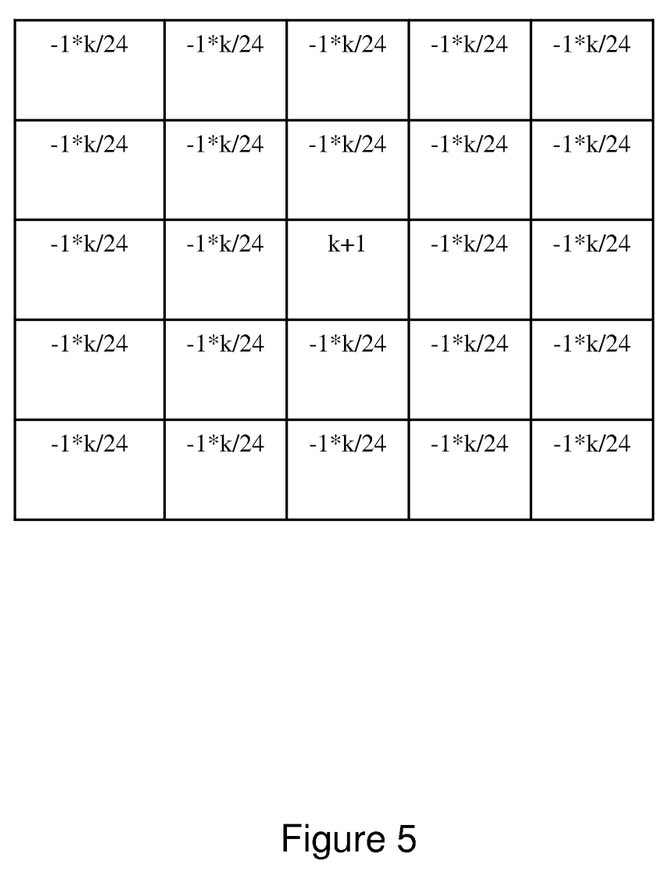
FIG. 5 illustrates an exemplary embodiment of Matrix A.

Image sharpness is improved by applying Matrix A, illustrated in FIG. 5, to this image. In FIG. 5, k is the sharpness index equal to unity (selected a posteriori).

The manipulations involve the following formula:

$$C'[x, y] = \sum_{i,j} A[i, j] \times C[x+i, y+j]$$

where:
i,j is the matrix applicability range (from −2 to +2);
A is the transformation matrix;
C' is the new pixel color; and
C is the original pixel color.

Section 4 Description of an Exemplary Computer Platform

Figure 6:
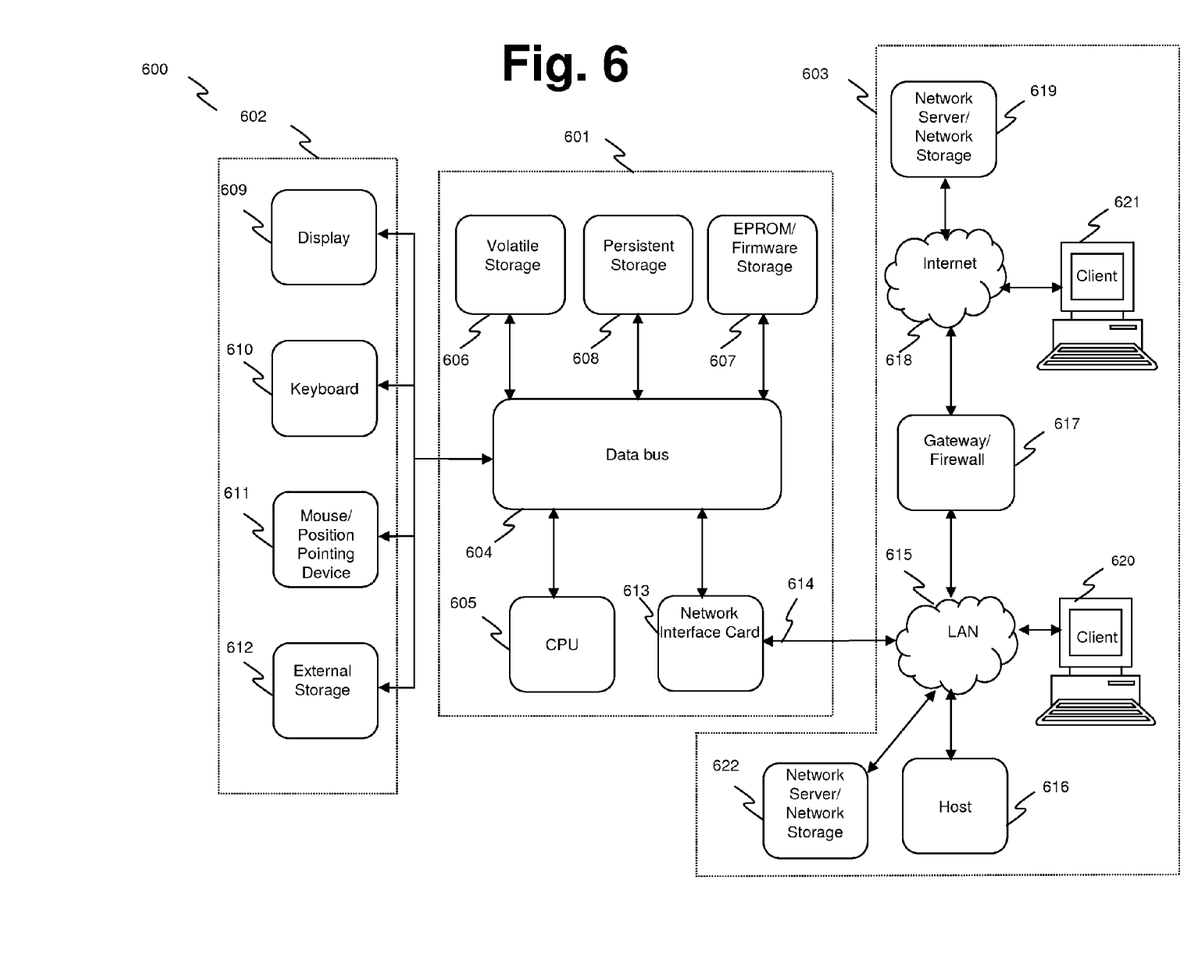
FIG. 6 illustrates an exemplary embodiment of a computer platform upon which the inventive system may be implemented.

FIG. 6 illustrates an exemplary embodiment of a computer platform upon which the inventive system may be implemented.

FIG. 6 is a block diagram that illustrates an embodiment of a computer/server system 600 upon which an embodiment of the inventive methodology may be implemented. The system 600 includes a computer/server platform 601, peripheral devices 602 and network resources 603.

The computer platform 601 may include a data bus 605 or other communication mechanism for communicating information across and among various parts of the computer platform 601, and a processor 605 coupled with bus 601 for processing information and performing other computational and control tasks. Computer platform 601 also includes a volatile storage 606, such as a random access memory (RAM) or other dynamic storage device, coupled to bus 605 for storing various information as well as instructions to be executed by processor 605. The volatile storage 606 also may be used for storing temporary variables or other intermediate information during execution of instructions by processor 605. Computer platform 601 may further include a read only memory (ROM or EPROM) 607 or other static storage device coupled to bus 605 for storing static information and instructions for processor 605, such as basic input-output system (BIOS), as well as various system configuration parameters.

A persistent storage device 608, such as a magnetic disk, optical disk, or solid-state flash memory device is provided and coupled to bus 601 for storing information and instructions.

Computer platform 601 may be coupled via bus 605 to a display 609, such as a cathode ray tube (CRT), plasma display, or a liquid crystal display (LCD), for displaying information to a system administrator or user of the computer platform 601. An input device 610, including alphanumeric and other keys, is coupled to bus 601 for communicating information and command selections to processor 605. Another type of user input device is cursor control device 611, such as a mouse, a trackball, or cursor direction keys for communicating direction information and command selections to processor 605 and for controlling cursor movement on display 609. This input device typically has two degrees of freedom in two axes, a first axis (e.g., x) and a second axis (e.g., y), that allows the device to specify positions in a plane.

An external storage device 612 may be coupled to the computer platform 601 via bus 605 to provide an extra or removable storage capacity for the computer platform 601. In an embodiment of the computer system 600, the external removable storage device 612 may be used to facilitate exchange of data with other computer systems.

The invention is related to the use of computer system 600 for implementing the techniques described herein. In an embodiment, the inventive system may reside on a machine such as computer platform 601. According to one embodiment of the invention, the techniques described herein are performed by computer system 600 in response to processor 605 executing one or more sequences of one or more instructions contained in the volatile memory 606. Such instructions may be read into volatile memory 606 from another computer-readable medium, such as persistent storage device 608. Execution of the sequences of instructions contained in the volatile memory 606 causes processor 605 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 605 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 608. Volatile media includes dynamic memory, such as volatile storage 606.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 605 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 605. The bus 605 carries the data to the volatile storage 606, from which processor 605 retrieves and executes the instructions. The instructions received by the volatile memory 606 may optionally be stored on persistent storage device 608 either before or after execution by processor 605. The instructions may also be downloaded into the computer platform 601 via Internet using a variety of network data communication protocols well known in the art.

The computer platform 601 also includes a communication interface, such as network interface card 613 coupled to the data bus 605. Communication interface 613 provides a two-way data communication coupling to a network link 615 that is coupled to a local network 615. For example, communication interface 613 may be an integrated services digital network (ISDN) card or a modem to provide a data communication connection to a corresponding type of telephone line. As another example, communication interface 613 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 613 sends and receives electrical, electromagnetic or optical signals that carry digital data streams representing various types of information.

Network link 613 typically provides data communication through one or more networks to other network resources. For example, network link 615 may provide a connection through local network 615 to a host computer 616, or a network storage/server 617. Additionally or alternatively, the network link 613 may connect through gateway/firewall 617 to the wide-area or global network 618, such as an Internet. Thus, the computer platform 601 can access network resources located anywhere on the Internet 618, such as a remote network storage/server 619. On the other hand, the computer platform 601 may also be accessed by clients located anywhere on the local area network 615 and/or the Internet 618. The network clients 620 and 621 may themselves be implemented based on the computer platform similar to the platform 601.

Local network 615 and the Internet 618 both use electrical, electromagnetic or optical signals that carry digital data streams. The signals through the various networks and the signals on network link 615 and through communication interface 613, which carry the digital data to and from computer platform 601, are exemplary forms of carrier waves transporting the information.

Computer platform 601 can send messages and receive data, including program code, through the variety of network(s) including Internet 618 and LAN 615, network link 615 and communication interface 613. In the Internet example, when the system 601 acts as a network server, it might transmit a requested code or data for an application program running on client(s) 620 and/or 621 through Internet 618, gateway/firewall 617, local area network 615 and communication interface 613. Similarly, it may receive code from other network resources.

The received code may be executed by processor 605 as it is received, and/or stored in persistent or volatile storage devices 608 and 606, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the system for enabling automated computer-aided image processing for generation of a 360 degree view model. It is intended that the specification and examples be considered as exemplary only, with a true scope and spirit of the invention being indicated by the following claims.

What is claimed is:

1. A computer-implemented method for generating of a 360 degree view of an object, the method comprising:

placing the object in a uniformly illuminated space with a uniformly colored background;

using a camera to acquire a plurality of images of the object, the plurality of images being acquired at different viewing angles;

using a processing unit to automatically reduce features of the plurality of the images to have substantially the same brightness across the images in the plurality of images, wherein substantially the same brightness is obtained using a Gauss filter based on the following formula: $g(x,y)=A*\exp\{-(x^2+y^2)/\sigma^2\}$, where A is a parameter responsible for normalization and x and y are coordinates in a zone associated with the Gauss filter, and $\sigma$ is a value of smearing;

using the processing unit to automatically adjust contrast across the images in the plurality of images;

using the processing unit to automatically find a contour associated with the object based on the Canny edge detection technique;

using the processing unit to automatically remove the background in each of the plurality of images by separating the object from the background substantially at the contour;

using the processing unit to automatically stabilize the object in each of the plurality of images by adjusting the plurality of images based on corresponding image acquisition angles; and using the processing unit to process the plurality of images with stabilized object to generate the 360 degree view of the object and to provide a visual effect of continuous-vision when viewed by a user.

2. The method of claim 1, wherein each of the plurality of images of the object are acquired against a white background.

3. The method of claim 1, wherein in each of the plurality of images, the object is stabilized using at least one reference mark placed in the view of the camera when the plurality of images are acquired.

4. The method of claim 3, wherein the at least one reference mark is of oval or circular shape.

5. The method of claim 1, wherein the image of the object is separated from the background in each of the plurality of images additionally using an image of the background without the object.

6. The method of claim 1, further comprising performing histogram equalization on each of the plurality of images of the object.

7. The method of claim 1, further comprising performing bleaching of the background on each of the plurality of images of the object.

8. A non-transitory computer-readable medium embodying a set of instructions, which, when executed by a processing unit causing the processing unit to perform a method for generating of a 360 degree view of an object, the method comprising:

place the object in a uniformly illuminated space with a uniformly colored background;

using a camera to acquire a plurality of images of the object, the plurality of images being acquired at different viewing angles;

using the processing unit to automatically reduce features of the plurality of the images to have substantially the same brightness across the images in the plurality of images, wherein substantially the same brightness is obtained using a Gauss filter based on the following formula: $g(x,y)=A*\exp\{-(x^2+y^2)/\sigma^2\}$, where A is a parameter responsible for normalization and x and y are coordinates in a zone associated with the Gauss filter, and $\sigma$ is a value of smearing;

using the processing unit to automatically adjust contrast across the images in the plurality of images;

using the processing unit to automatically find a contour associated with the object based on the Canny edge detection technique;

using the processing unit to automatically remove the background in each of the plurality of images by separating the object from the background substantially at the contour;

using the processing unit to automatically stabilize the object in each of the plurality of images by adjusting the plurality of images based on corresponding image acquisition angles; and using the processing unit to process the plurality of images with stabilized object to generate the 360 degree view of the object and to provide a visual effect of continuous-vision when viewed by a user.

9. The computer-readable medium of claim 8, wherein each of the plurality of images of the object are acquired against a white background.

10. The computer-readable medium of claim 8, wherein in each of the plurality of images, the object is stabilized using at least one reference mark placed in the view of the camera when the plurality of images are acquired.

11. The computer-readable medium of claim 10, wherein the at least one reference mark is of oval or circular shape.

12. The computer-readable medium of claim 8, wherein the image of the object is separated from the background in each of the plurality of images additionally using an image of the background without the object.

13. The computer-readable medium of claim 8, wherein the method further comprises performing histogram equalization on each of the plurality of images of the object.

14. The computer-readable medium of claim 8, wherein the method further comprises performing bleaching of the background on each of the plurality of images of the object.

15. A computerized system for generating of a 360 degree view of an object, the system comprising a processing unit and a memory, the processing unit being configured to:

place the object in a uniformly illuminated space with a uniformly colored background;

receive a plurality of images of the object, the plurality of images having being acquired at different viewing angles;

automatically reduce features of the plurality of the images to have substantially the same brightness across the images in the plurality of images, wherein substantially the same brightness is obtained using a Gauss filter based on the following formula: $g(x,y)=A*\exp\{-(x^2+y^2)/\sigma^2\}$, where A is a parameter responsible for normalization and x and y are coordinates in a zone associated with the Gauss filter, and $\sigma$ is a value of smearing;

automatically adjust contrast across the images in the plurality of images;

automatically find a contour associated with the object based on the Canny edge detection technique;

automatically remove the background in each of the plurality of images by separating the object from the background substantially at the contour;

automatically stabilize the object in each of the plurality of images by adjusting the plurality of images based on corresponding image acquisition angles; and process the plurality of images with stabilized object to generate the 360 degree view of the object and to provide a visual effect of continuous-vision when viewed by a user.

16. The computerized system of claim 15, wherein each of the plurality of images of the object are acquired against a white background.

17. The computerized system of claim 15, wherein in each of the plurality of images, the object is stabilized using at least one reference mark placed in the view of the camera when the plurality of images are acquired.

18. The computerized system of claim 17, wherein the at least one reference mark is of oval or circular shape.

19. The computerized system of claim 15, wherein the image of the object is separated from the background in each of the plurality of images additionally using an image of the background without the object.

20. The computerized system of claim 15, wherein the processing unit is further operable to perform histogram equalization on each of the plurality of images of the object.

* * * * *